(12) United States Patent
Kawakami (10) Patent No.: US 6,430,380 B2
(45) Date of Patent: Aug. 6, 2002

(54) WET TYPE IMAGE FORMING APPARATUS AND INFORMATION PROCESSING SYSTEM USING THIS APPARATUS

(75) Inventor: Osamu Kawakami, Niigata (JP)

(73) Assignee: Fuji Xerox Co., Ltd. (JP)

( * ) Notice: Subject to any disclaimer, the term of this patent is extended or adjusted under 35 U.S.C. 154(b) by 0 days.

(21) Appl. No.: 09/757,371

(22) Filed: Jan. 9, 2001

(30) Foreign Application Priority Data

Jan. 12, 2000 (JP) ........................................ 2000-003995

(51) Int. Cl.$^7$ .............................................. G03G 15/10
(52) U.S. Cl. ............................................ 399/57; 73/313
(58) Field of Search ........................ 399/27, 57, 61, 399/63, 237; 73/305, 306, 308, 313

(56) References Cited

U.S. PATENT DOCUMENTS

| | | | | |
|---|---|---|---|---|
| 4,627,283 A | * | 12/1986 | Nishida et al. | 73/313 |
| 4,730,491 A | * | 3/1988 | Lew | 73/308 |
| 5,347,864 A | * | 9/1994 | Senghaas | 73/313 |
| 5,829,303 A | * | 11/1998 | Fraser | 73/313 X |
| 5,983,047 A | * | 11/1999 | Lee | 399/57 |
| 6,120,195 A | * | 9/2000 | Nakano | |

FOREIGN PATENT DOCUMENTS

| | | |
|---|---|---|
| JP | 58-194070 | * 11/1983 |
| JP | 62-263059 | 11/1987 |
| JP | 63-147650 | 6/1988 |
| JP | 1-85853 | 6/1989 |
| JP | 8-25646 | 1/1996 |

\* cited by examiner

*Primary Examiner*—Sandra Brase
(74) *Attorney, Agent, or Firm*—Ostrolenk, Faber, Gerb & Soffen, LLP (57) ABSTRACT

The wet type image forming apparatus includes: a columnar body (3) fixed within an ink tank (1); a plurality (n) of reed switches (4) to (6) that are arrayed in upper and lower directions in the columnar body (3) and respond to a magnet; a float (7) which has a magnet and is floated within the ink tank (1) and moved upwardly or downwardly along the columnar body (3) in association with an increase or a decrease of an ink amount; an ON/OFF state detecting circuit (8) for detecting the ON/OFF states of the reed switches (4) to (6); a memory (10) for setting the correspondence relation between a combination of the ON/OFF states of the reed switches (4) to (6) and the ink amounts at n×2 steps and storing it therein; and a remaining amount judging device (9) for judging the ink amounts at the n×2 steps, by referring to the memory 10, in accordance with the ON/OFF information of the reed switches (4) to (6) sent by the ON/OFF state detecting circuit (8). Accordingly, the remaining amount of the ink tank can be detected in the manner of many steps by using the necessarily minimum reed switches.

24 Claims, 5 Drawing Sheets

| POSITION | REED SWITCH 4 | REED SWITCH 5 | REED SWITCH 6 | REMAINING AMOUNT |
|---|---|---|---|---|
| A | ON | OFF | OFF | UPPER LIMIT |
| B | ON | ON | OFF | SLIGHTLY LARGE AMOUNT |
| C | OFF | ON | OFF | MODERATE AMOUNT |
| D | OFF | ON | ON | SLIGHTLY SMALL AMOUNT |
| E | OFF | OFF | ON | SMALL AMOUNT |
| F | OFF | OFF | OFF | EMPTY AMOUNT |

Fig. 5

(20S: RESPONSE RANGE OF REED SWITCH 20)
(21S: RESPONSE RANGE OF REED SWITCH 21)

Fig. 6

| POSITION | REED SWITCH 20 | REED SWITCH 21 | REMAINING AMOUNT |
|---|---|---|---|
| a | OFF | OFF | UPPER LIMIT |
| b | ON | OFF | LARGE AMOUNT |
| c | ON | ON | MODERATE AMOUNT |
| d | OFF | ON | SMALL AMOUNT |
| e | OFF | OFF | EMPTY AMOUNT |

WET TYPE IMAGE FORMING APPARATUS AND INFORMATION PROCESSING SYSTEM USING THIS APPARATUS

BACKGROUND OF THE INVENTION

1. Field of the Invention

The present invention relates to a wet type image forming apparatus that uses ink and the like, and an information processing system using the wet type image forming apparatus. More particularly, the present invention relates to a technique for detecting a liquid surface level of an ink tank in a manner of many steps.

2. Description of the Related Art

A wet type image forming apparatus which uses a liquid developer, ink and the like is used in a printer, a copier and the like. Conventionally, as a method for checking a remaining amount of an ink tank of the wet type image forming apparatus, there are a method based on a visual inspection by a user, and another method for automatically detecting a liquid surface level of an ink tank and then reporting it to a user. A wet type image forming apparatus is known in which a capacitance sensor and a light sensor using a light emitting device and a light sensing device are used, in order to detect a liquid surface level of an ink tank. However, those sensors are typically expensive, which causes a cost of the wet type image forming apparatus to be increased.

Japanese Laid Open Utility Model (JU-A-Heisei, 1-85853) discloses a liquid developing device for detecting a liquid surface level of an ink tank by using a reed switch, in order to make a price cheaper. This liquid developing device has an excess toner recovery device for recovering an excessive toner on a dielectric-coated paper after developing with an electrostatic recording head by using a liquid toner from a liquid toner tank. Two reed switches are mounted in this excess toner recovery device. Among them, one reed switch is mounted in a vicinity of an upper end, and the other reed switch is mounted in a vicinity of a bottom tip. ON/OFF operations of the two reed switches are controlled on the basis of a position of a float magnet which is moved upwardly or downwardly within the excess toner recovery device, in accordance with an excess liquid amount. The reed switch mounted in the vicinity of the upper end is turned ON if the excess liquid amount within the excess toner recovery device is likely to overflow. Accordingly, an occurrence of clogging in a toner exhaust pipe of the excess toner recovery device is detected. Also, such a fact that there is no liquid toner in the liquid toner tank is detected when the reed switch mounted in the vicinity of the bottom tip is turned ON.

In a recent environment in which a plurality of users use a network printer through a remote control and thereby use a large amount of ink, the ink that is consumptive material is hugely exhausted. Thus, it is necessary to report a remaining amount of ink to the user in a careful manner (in a manner of many steps) and also necessary to attain a cheap price.

However, in the liquid developing device disclosed in Japanese Laid Open Utility Model (JU-A-Heisei, 1-85853), the cheap price is attained by using the reed switch. However, the detection of the excess liquid amount is done only in the two steps of the vicinity of the upper end and the vicinity of the bottom tip. Thus, this does not satisfy the request of the report of the remaining amount in the careful manner (in the manner of many steps).

Also, because the two reed switches are used in order to detect the excess liquid amount in the manner of two steps, it is not efficient. Moreover, the liquid amount within the liquid toner tank is only estimated based on the excess liquid amount within the excess toner recovery device detected by the two reed switches. Thus, it does not directly detect the liquid amount in the liquid toner tank itself.

As a related technique, Japanese Laid Open Patent Application (JP-A-Showa, 62-263059) discloses a liquid jet recording apparatus. This liquid jet recording apparatus is equipped with a float having a magnet inside of a tank, and a Hall element responding to the magnet at a position where a recording operation is not obstructed, outside the tank. Thus, the remaining liquid amounts in a plurality of liquid tanks can be detected with only one Hall element.

Japanese Laid Open Patent Application (JP-A-Showa, 63-147650) discloses a recording apparatus. This recording apparatus has a plurality of pairs of light paths arranged in a vertical direction at a wall of an ink tank. The light paths in combination with a floating body that can shut off those light paths can detect whether an ink amount within the ink tank is large or small, on the basis of a position of the floating body. A recordable amount is reported to an operator, in accordance with the detected result.

Moreover, Japanese Laid Open Patent Application (JP-A-Heisei, 8-25646) discloses a recording apparatus and an information processing system. The recording apparatus includes an ink amount sensor, a float member and a supporter. The ink amount sensor is composed of a light emitting device and a light sensing device for receiving a light from the light emitting device. The float member is composed of at least two sections whose widths are different from each other. The support member floats the float member along a predetermined direction at a predetermined position within an ink cartridge, in which at least a part of the float member is inserted so as to slide. Then, it detects a remaining ink amount within the ink cartridge in a manner of many steps.

SUMMARY OF THE INVENTION

Therefore, an object of the present invention is to provide a wet type image forming apparatus which can detect a remaining amount of an ink tank in a manner of many steps by effectively using a reed switch as a liquid surface level detecting device, and provide an information processing system using the wet type image forming apparatus.

In order to accomplish the object, a wet type image forming apparatus according to a fist aspect of the present invention comprises an ink tank, a float, n reed switches and a detector.

The ink tank stores ink therein. The float has a magnet, and moves upwardly or downwardly in association with a change of a liquid surface of the ink stored in the ink tank. The n reed switches are distributedly arranged from an upper portion of the ink tank to a lower portion thereof and are turned ON or OFF in response to the magnet, where n is an integer equal to or more than 2. The detector detects an amount of the ink in the ink tank in m steps based on a combination of ON and OFF states of the n reed switches, where m>n, m is an integer.

This wet type image forming apparatus may further comprise a columnar body which is fixed in the ink tank, wherein the n reed switches are arranged on the columnar body. In this case, the m may be equal to 2×n.

In this wet type image forming apparatus, the detector may include a detecting circuit, a memory and a remaining amount judging portion. The detecting circuit detects an ON or OFF state of each of the n reed switches. The memory stores therein a correspondence relation of the combination of the ON and OFF states of the n reed switches and the amount of the ink in the ink tank, wherein the amount is represented in 2×n steps. The remaining amount judging portion judges the amount of ink in the ink tank based on the correspondence relation stored in the memory and the combination of ON and OFF states of the n reed switches detected at the detecting circuit.

In the wet type image forming apparatus, the n reed switches may be arranged on the columnar body to define response ranges in which each of the n reed switches is turned ON independently, response ranges in which two of the n reed switches adjacent to each other are turned ON and a non-response range formed at any one of an upper end portion and a bottom tip portion of the columnar body in which all of the n reed switches are turned OFF.

Also, in the wet type image forming apparatus, the 2×n steps may be classified into n steps in which only one of the n reed switches is turned ON, n−1 steps in which every two of the n reed switches adjacent to each other are turned ON and one step in which all of the n reed switches are turned OFF.

Also, the wet type image forming apparatus may further comprise a display which displays the ink amount judged by the remaining amount judging portion.

Furthermore, in this wet type image forming apparatus, the m may be equal to 2×n+1. In this case, the 2×n+1 steps may be classified into n steps in which only one of the n reed switches is turned ON, n−1 steps in which every two of the n reed switches adjacent to each other are turned ON and two steps in which all the reed switches are turned OFF.

The wet type image forming apparatus according to the first aspect of the present invention may further comprise a developing device to which the ink from the ink tank is supplied, wherein the interval between a first reed switch arranged in an upper end portion of the columnar body and a second reed switch arranged adjacently to the first reed switch is set such that when the ink is supplied to the developing device from the ink tank under a condition in which a liquid surface is present at the upper end portion, an ink amount is decreased by one step.

In this case, the remaining amount judging portion may supply the ink from the ink tank to the developing device when the detecting circuit detects a state showing that all of the n reed switches are in the OFF state immediately after a power turned on, then judges that the liquid surface is present in the bottom tip portion of the ink tank when the ink amount is not decreased by one step, and judges that the liquid surface is present in the upper end portion of the ink tank when the ink amount is decreased by one step.

In order to accomplish the object, an information processing system according to a second aspect of the present invention comprises a wet type image forming apparatus and a processor which processes information and outputs the processed result to the wet type image forming apparatus. In this case, as the wet type image forming apparatus, the wet type image forming apparatus according to the first aspect of the present invention may be employed.

DESCRIPTION OF THE PREFERRED EMBODIMENTS

Now, embodiments of the present invention will be described below with reference to the attached drawings.

Figure 1:
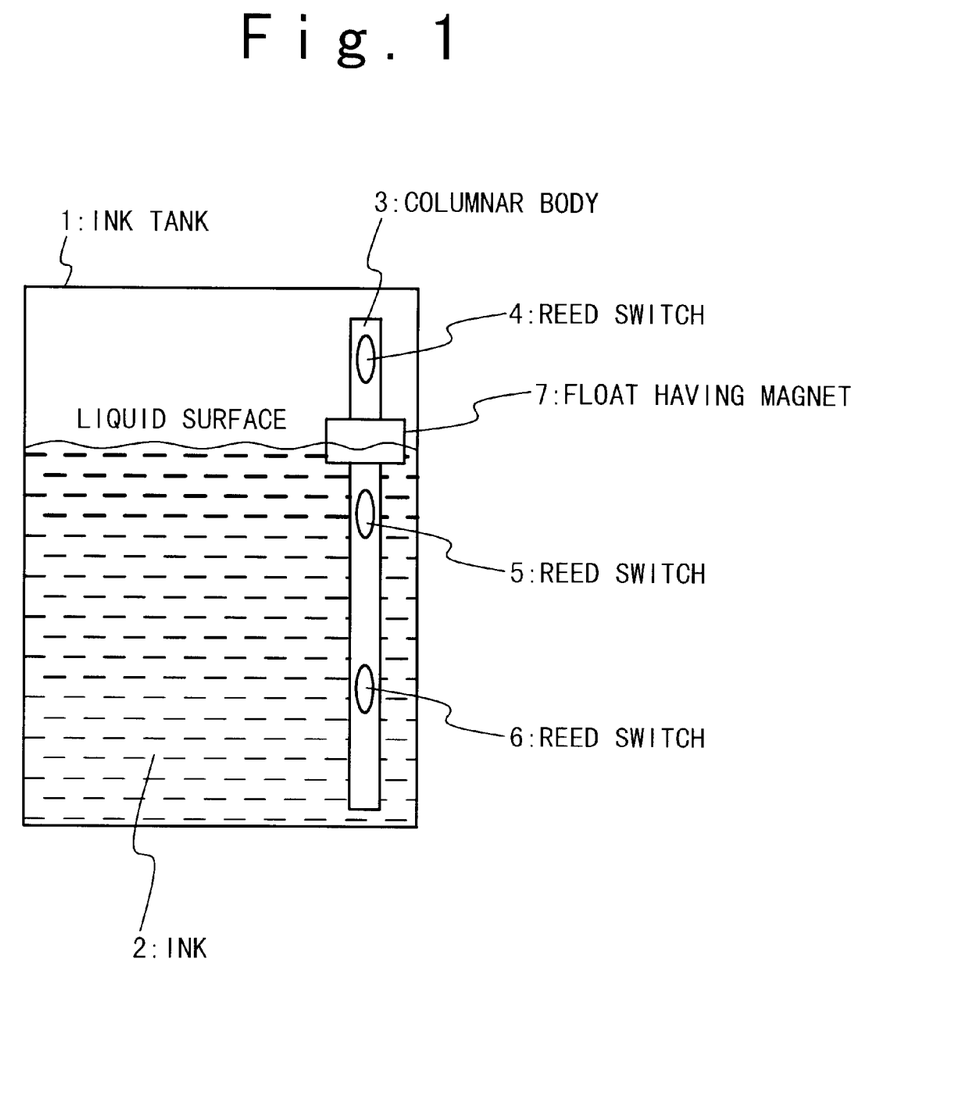
FIG. 1 is a view showing a configuration of an ink tank of a wet type image forming apparatus according to first and second embodiments of the present invention.

FIG. 1 shows a structure of an ink tank 1 of a wet type image forming apparatus according to first and second embodiments of the present invention. Referring to FIG. 1, the ink tank 1 houses ink 2 inside it. The ink tank 1 is equipped with a columnar body 3 fixed within the ink tank 1 and a float 7 (floating body) which has a magnet, and is moved upwardly or downwardly along the columnar body 3 on the basis of a liquid surface level of the ink 2. Reed switches 4, 5 and 6 respectively built in a vicinity of an upper end, a middle portion and a vicinity of a bottom tip of the columnar body 3. The float 7 may have a shape to enclose the columnar body 3 or may be designed so as to move along another guide correspondingly to the columnar body 3.

(First Embodiment)

Figure 2:
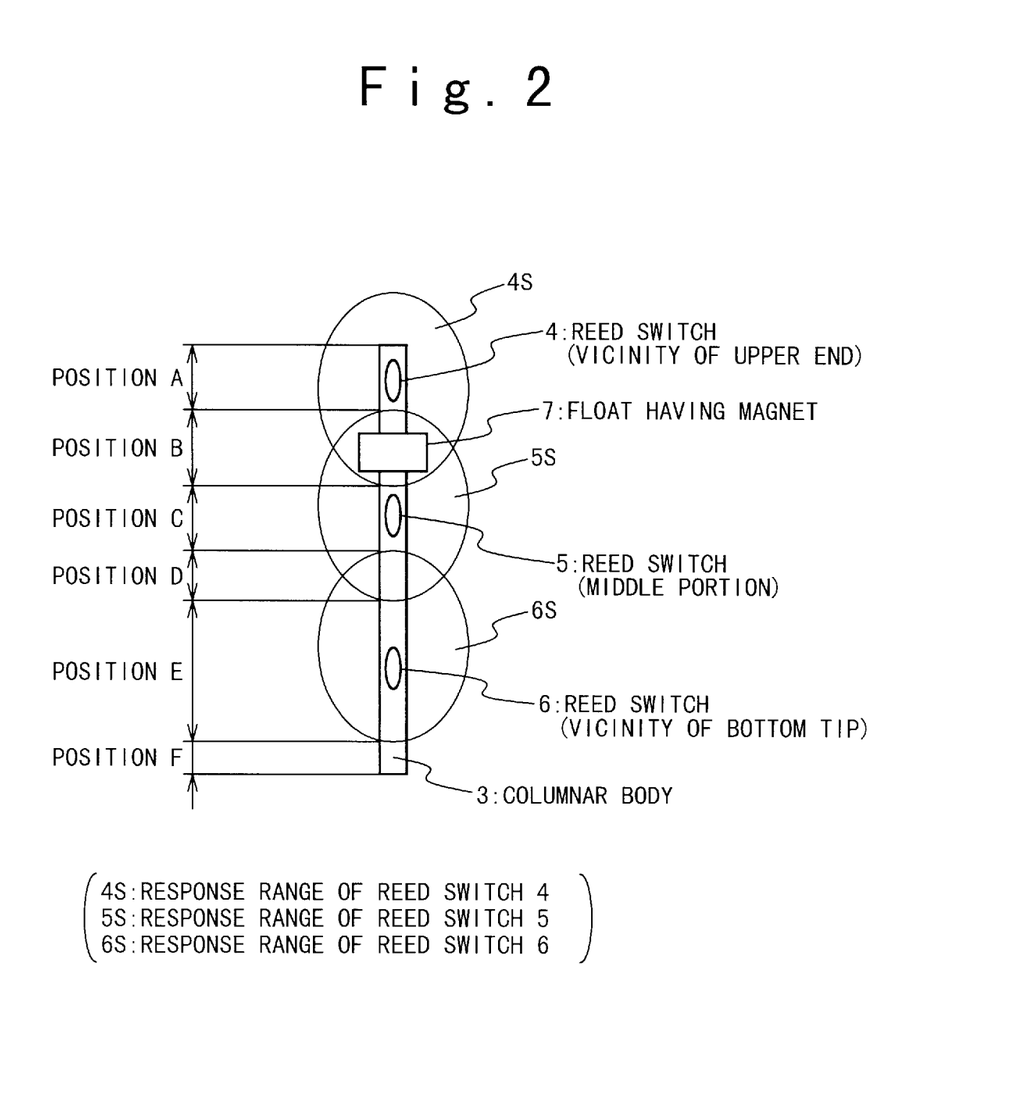
FIG. 2 is a view showing a relation between a position of a float having a magnet and operations of respective reed switches in the first embodiment of the present invention.

FIG. 2 shows a relation between the operations of the reed switches 4, 5 and 6 and a position of the float 7 in the first embodiment of the present invention. As shown in FIG. 2, the reed switch 4 is mounted on the vicinity of the upper end of the columnar body 3, the reed switch 5 is mounted on the middle portion, and the reed switch 6 is mounted on the vicinity of the bottom tip, respectively.

In this case, the reed switches 4, 5 are arranged such that a response range 4S of the reed switch 4 and a response range 5S of the reed switch 5, which are influenced by the float 7, overlap with each other between the reed switches 4, 5. That is, they are mounted such that when the float 7 is located at a position B, both the reed switches 4, 5 response to the float 7 to thereby turn ON. Similarly, the reed switch 6 is also mounted such that a response range 6S of the reed switch 6 and the response range 5S of the reed switch 5 overlap with each other at a position D between the reed switches 5, 6. It should be noted that the reed switches 4, 5 and 6 are mounted such that only the reed switch 4 responses to the float 7 when it is located at a position A in the vicinity of the upper end of the columnar body 3. Also, the respective reed switches are mounted to form a position F at which all the reed switches 4, 5 and 6 are turned OFF in the vicinity of the bottom tip of the columnar body 3. Moreover, they are mounted such that only the reed switch 5 is turned ON at a position C, and only the reed switch 6 is turned ON at a position E.

Figure 3:
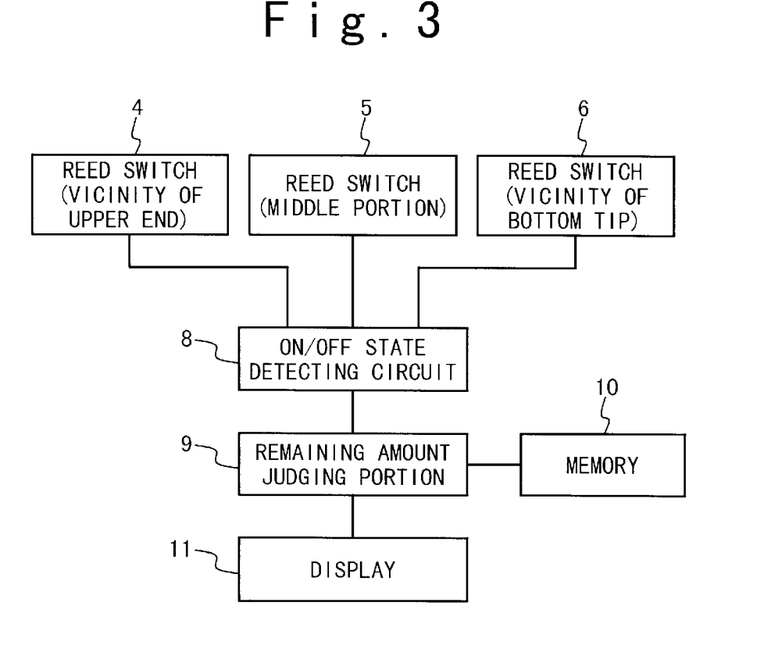
FIG. 3 is a block diagram showing a electric configuration of a wet type image forming apparatus according to the first embodiment of the present invention.

FIG. 3 is a block diagram showing a electric configuration of the wet type image forming apparatus according to the first embodiment of the present invention. The wet type image forming apparatus includes the reed switch 4, the reed switch 5, the reed switch 6, an ON/OFF state detecting circuit 8, a remaining amount judging portion 9, a memory 10 and display 11.

The reed switch 4 is mounted in the vicinity of the upper end of the columnar body 3, the reed switch 5 is mounted in the middle portion thereof and the reed switch 6 is mounted in the vicinity of the bottom tip thereof. The ON/OFF state detecting circuit 8 detects the ON/OFF states of the respective reed switches 4, 5 and 6 to produce ON/OFF signals. The memory 10 stores a correspondence between the remaining ink amount and a combination of the ON/OFF states in the respective reed switches. The remaining amount judging portion 9 is composed of CPU and the like. The remaining amount judging portion 9 judges a remaining amount of the ink 2 within the ink tank 1 based on contents of the memory 10 and the ON/OFF signals corresponding to the reed switches 4, 5 and 6 sent from the ON/OFF state detecting circuit 8. The display 11 displays thereon a message representing the remaining amount of the ink 2 within the ink tank 1, in a manner of many steps, in accordance with a judged result from the remaining amount judging portion 9.

Figure 4:
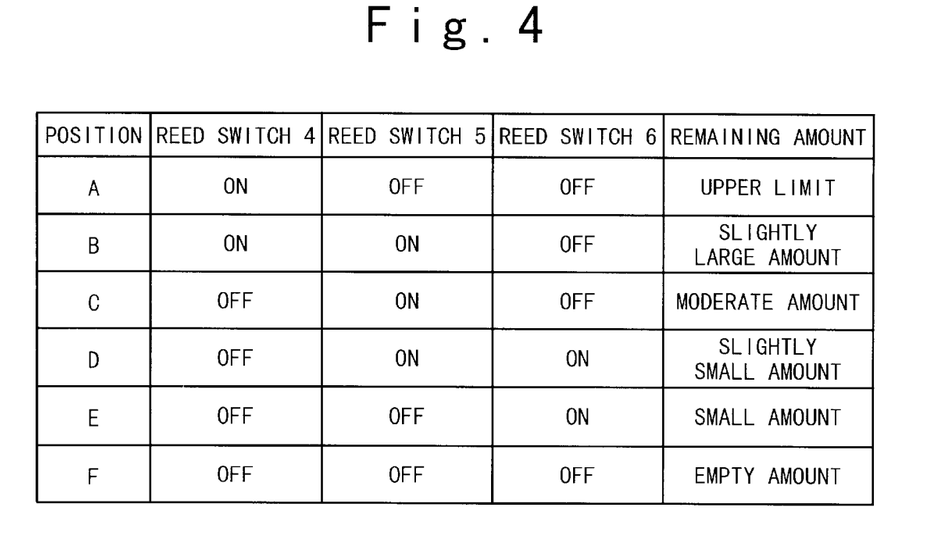
FIG. 4 is a view showing a correspondence between a remaining ink amount and a combination of ON/OFF states of the respective reed switches in the first embodiment of the present invention.

FIG. 4 shows the correspondence between the remaining ink amount and the combination of the ON/OFF states of the respective reed switches in the first embodiment of the present invention.

Next, an operation of the wet type image forming apparatus according to the first embodiment of the present invention will be described below in detail with reference to FIGS. 1 to 4.

As shown in FIG. 1, the float 7 is moved upwardly or downwardly along the columnar body 3, on the basis of an increase or a decrease of the liquid surface of the ink 2 within the ink tank 1. Each of the reed switches 4, 5 and 6 is turned ON or OFF in accordance with a change in a positional relation to the magnet of the float 7 in association with a movement of the float 7. The relation between the position of the float 7 and the operations of the reed switches 4, 5 and 6 is as shown in FIG. 2. Its detailed relation is already described in the above explanation by referring FIG. 2. So, it is omitted in order to avoid the duplication.

When a case in which the float 7 is located at the position B of FIG. 2 is exemplified, the response range 4S of the reed switch 4 and the response range 5S of the reed switch 5 overlap with each other, as shown in FIG. 2. As a result, both the reed switches 4, 5 are turned ON. Also, as another example, when the float 7 is located at the position C of FIG. 2, because the float 7 is belonged in the response range only for the reed switch 5, only the reed switch 5 is turned ON.

As shown in FIG. 3, the ON/OFF states of the reed switches 4, 5 and 6 which is turned ON or OFF in accordance with the position of the float 7 are detected for each reed switch by the ON/OFF state detecting circuit 8. Then, the detecting results are sent to the remaining amount judging portion 9 as ON/OFF signals.

The remaining amount judging portion 9 determines the remaining amount of the ink 2 within the ink tank 1, on the basis of the ON/OFF signals corresponding to the reed switches 4, 5 and 6 sent from the ON/OFF state detecting circuit 8. At this time, the remaining amount judging portion 9 checks whether or not the combination of the ON/OFF signals sent from the ON/OFF state detecting circuit 8 is stored in the memory 10. As shown in FIG. 4, the memory 10 stores therein combinations of the ON/OFF states of the respective reed switches 4, 5 and 6 correspond to the six states of FIG. 2, respectively. Also, the memory 10 stores therein messages for a remaining amount display corresponding to the six states of FIG. 2, respectively.

For example, if both the reed switches 4, 5 are at the ON-state and the reed switch 6 is at the OFF-state, the remaining amount judging portion 9 so judges the remaining amount to be "Slightly Large". If only the reed switch 5 is at the ON-state and both the reed switches 4, 6 are at the OFF-state, the remaining amount judging portion 9 judges the remaining amount to be "Moderate Amount". The remaining amount judging portion 9 reports the judged results to the display 11.

If the combination of the ON/OFF signals corresponding to the reed switches sent from the ON/OFF state detecting circuit 8 is not stored in the memory 10, the remaining amount judging portion 9 judges the operation of the wet image forming apparatus to be abnormal, and reports its fact to the display 11.

The display 11 displays thereon the judgment result of the abnormality or the remaining amount sent from the remaining amount judging portion 9.

It should be noted that when the float 7 is located at any of boundaries between the respective positions A to F in FIG. 2, a chattering is induced in an ON signal of each reed switch. In this case, the ON/OFF state detecting circuit 8 may carry out an averaging process at a step after detecting the ON/OFF states of the reed switches 4, 5 and 6. Thus, it is possible to easily avoid looseness in the remaining amount display.

Also, in FIG. 2, the case in which an area where all the reed switches are at the OFF-state is the bottom tip of the columnar body 3 is described. However, the position of the reed switch may be shifted so that as the area, the upper end is used instead of the bottom tip.

(Second Embodiment)

Now, a second embodiment of the present invention will be described below with reference to the drawings.

Figure 5:
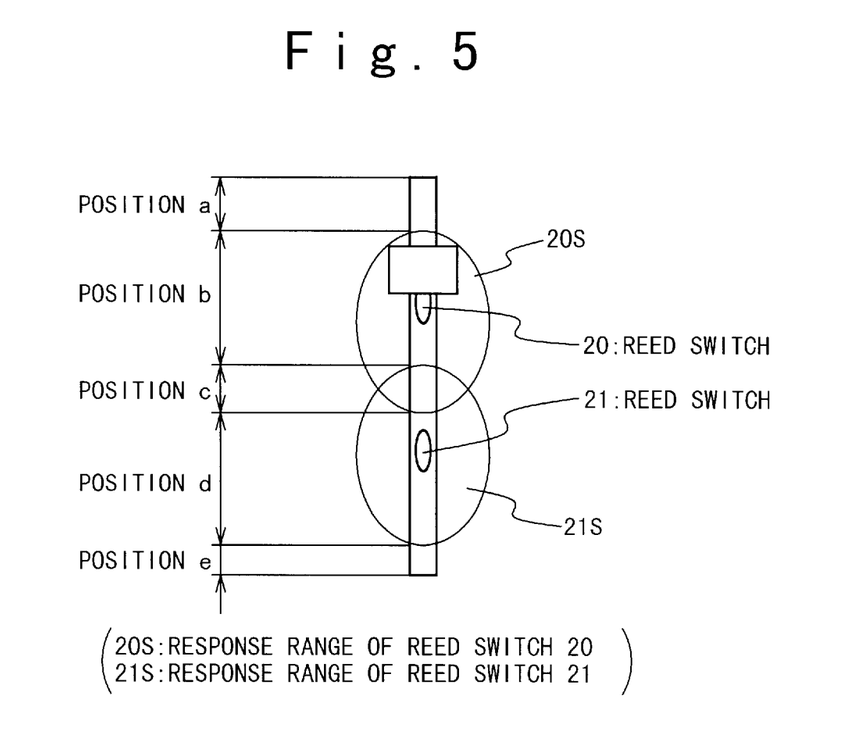
FIG. 5 is a view showing a relation between operations of respective reed switches and a position of a float having a magnet in the second embodiment of the present invention.
Figure 6:
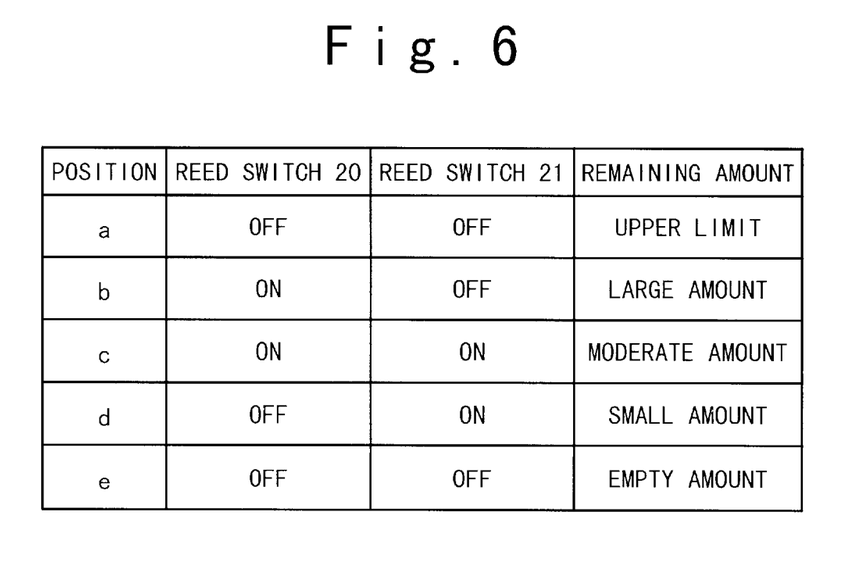
FIG. 6 is a view showing a correspondence between a remaining ink amount and a combination of ON/OFF states of the respective reed switches in the second embodiment of the present invention.

FIG. 5 shows a relation between operations of respective reed switches and a position of a float having a magnet in the second embodiment of the present invention, and FIG. 6 shows a correspondence between a remaining ink amount and a combination of ON/OFF states of the respective reed switches in the second embodiment of the present invention.

In the first embodiment of the present invention, the three reed switches are used in order to detect the remaining amount in the manner of six steps (an upper limit, a slightly large amount, a moderate amount, a slightly small amount, a small amount and an empty amount). This is caused by performing the judgment with regard to the liquid surface level states having a total of six steps of: the three steps when only each one reed switch is at the ON-state; the two steps when the two reed switches adjacent to each other are at the ON-state; and the one step when all the reed switches are at the OFF-state. That is, the judgment (the judgment of the remaining amount) is done under the liquid surface level states of the number of steps equal to twice the number of reed switches.

On the contrary, this second embodiment is characterized by performing the judgment (judgment of the remaining amount) of the liquid surface level states of the number of steps equal to twice the number of reed switches plus one.

For example, if the number of reed switches is 3, the state of 7 steps (3×2+1=7) is judged, and if the number of reed switches is 2, the state of 5 steps (2×2+1=5) is judged. FIG. 5 shows the case in which two reed switches of a reed switch 20 and a reed switch 21 are mounted.

Referring to FIGS. 5 and 6, for detecting the positions "a" to "e" on the liquid surface, the liquid surface level states are judged under a total of five steps of two steps when only each one reed switch is at the ON-state, one step when two reed switches are at the ON-state, and two steps when all the reed switches are at the OFF-state. Here, the difference from the first embodiment of the present invention is such a point that the two steps are provided when the all reed switches are at the OFF-state.

That is, in the two states of the empty state at the position "e" and a full state (the upper limit of the liquid surface) at the position "a", ranges in which all the reed switches are at the OFF-state are produced. Thus, it is not possible to distinguish the two states. To solve this problem, the previous state is stored in the memory 10 of FIG. 3. That is, the remaining amount judging portion 9, every time a change of the state (position) of the liquid surface is detected based on the judgment result of the remaining amount, stores the state in the memory 10. Then, the remaining amount judging portion 9, when receiving the information indicative of the OFF-states of all the reed switches from the ON/OFF state detecting circuit 8, refers to the memory 10, and checks the previous state. As a result, if the previous state is the position "d", it is so judged that a current state is the empty state at the position "e". If the previous state is the position "a", it is so judged that the current state is the full state (the upper limit) at the position "a".

Figure 7:
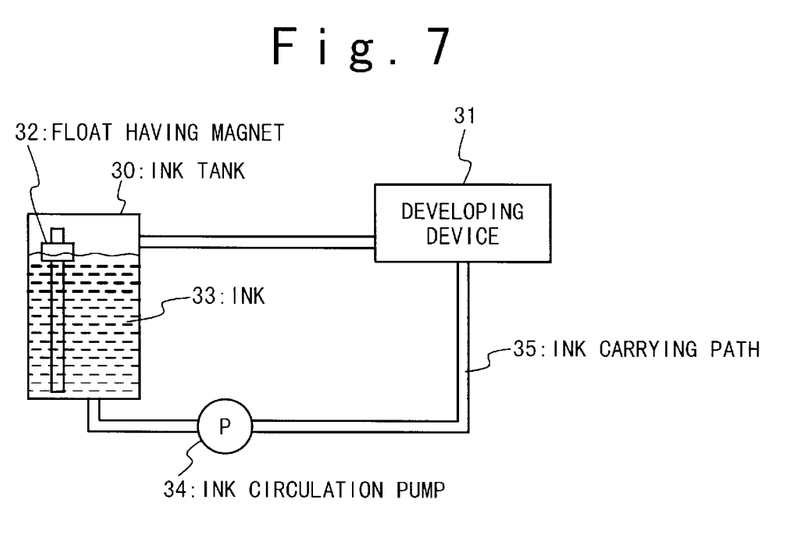
FIG. 7 is a view showing a condition before ink circulation in the second embodiment of the present invention.

The above-mentioned explanation describes the judging method when all the reed switches are at the OFF-state during the operation of the apparatus. A judging method immediately after a power supply is turned on or when a power failure is recovered will be described below. Of course, the above-mentioned judging method may be used if the power supply of the apparatus is always turned on, or if the state can be kept in an EEPROM and the like even in a case of a stop of the power supply. Here, a case except the case, which has been mentioned above, is described with reference to FIGS. 7 and 8. FIG. 7 shows a condition before ink circulation in the second embodiment of the present invention, and FIG. 8 shows a condition after the ink circulation in the second embodiment of the present invention.

Figure 8:
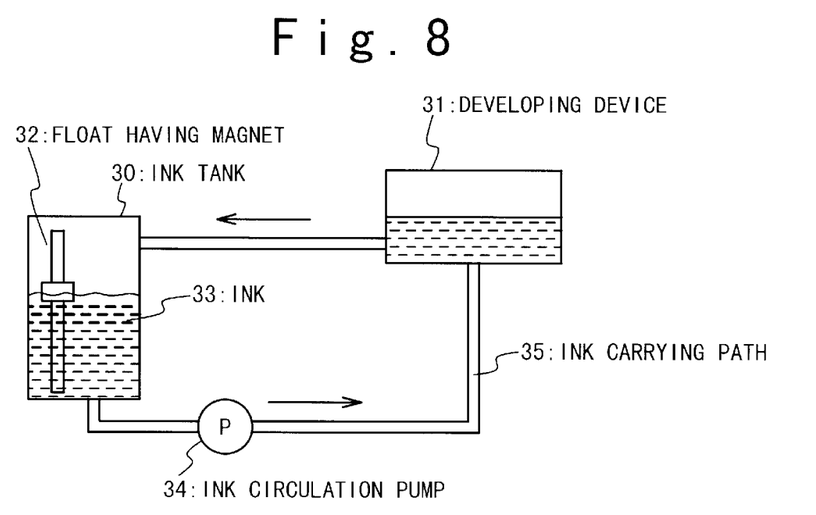
FIG. 8 is a view showing a condition after the ink circulation in the second embodiment of the present invention.

In this case, if all the reed switches are at the OFF-state immediately after the power supply is turned on, because the previous state can not be understood, a condition immediately after the turning on shown in FIG. 7 is changed to another condition shown in FIG. 8. That is, if the remaining amount judging portion 9 receives the detection result indicative of the OFF-states of all the reed switches from the ON/OFF state detecting circuit when an initialization is carried out since the power supply is turned on, it drives an ink circulation pump 34, as shown in FIG. 8. Accordingly, ink 33 within an ink tank 30 is sent through an ink-carrying path 35 to a developing device 31. As a result, as shown in FIG. 8, the ink 33 within the ink tank 30 is decreased, and a float 32 having a magnet is moved downwardly. If the ON-state only of a reed switch 20 is detected, it can be judged that the float existed at a position of an upper limit. It should be noted that even if the ink circulation pump 34 is driven, when the liquid surface of the ink 33 is not decreased, this case is judged as the empty state since the ink is not circulated.

This method can be attained by optimizing the relation between the amount of the ink circulated through the ink carrying path 35 and the developing device 31 and the amount of the liquid surface decrease within the ink tank 30. For example, it is enough to set an amount of a liquid surface decrease to the position "b" from the position "a" shown in FIG. 5 to be equal to an amount of an ink circulation when the ink circulation pump 34 is driven. It should be noted that the ink circulation pump 34 and the ink carrying path 35 are not specially added in order to detect the liquid surface level in the present invention. They are originally necessary in this type of the wet type image forming apparatus. Even if the same two conditions are present as mentioned above, the judgment can be done without any addition of a special part. Moreover, the liquid surface level can be detected in the manner of many steps by using a smaller number of reed switches.

Incidentally, the above-mentioned ink tanks in the first and second embodiments of the present invention may be a type that can be supplemented or exchanged by a user. Also, the present invention can be applied to even an automatic supplement type of an ink tank that is mounted for an automatic supplement, apart from the ink tank that can be supplemented or exchanged by the user. In the automatic supplement type of an ink tank, if the ink amount is decreased, ink is automatically supplemented up to a position of a moderate amount from the ink tank supplemented by the user.

Also, as for the reed switch, the case of the two reed switches and the case of the three reed switches are described. However, the number of reed switches are not limited to two or three. It may be four or five. That is, the number may be plural. Moreover, the interval between the reed switches arranged in upper and lower directions on the columnar body may be arbitrarily determined.

A sensor, such as a Hall element and the like, and another sensor that can overlap with two detection ranges may be used instead of the reed switch. It should be noted that it is naturally possible to detect various ink amounts by changing the number of reed switches, the overlapping manner and the like.

The case in which the reed switches are mounted within the ink tank is described. However, they may be mounted on an outer wall of the ink tank.

The detection and the display of the remaining amount may be perform in any time of an image forming and a stand-by. Also, they may be done in both the times of the image forming and the stand-by.

Figure 9:
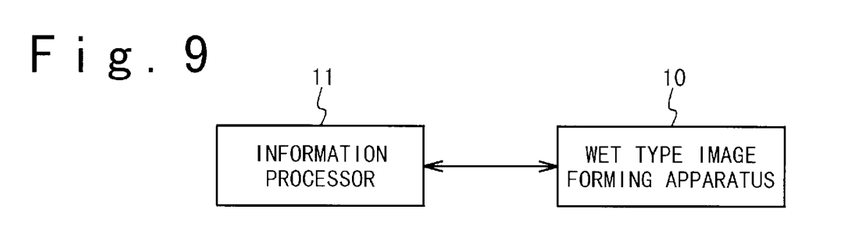
FIG. 9 is a view showing an information processing system in which the wt type image forming apparatus according to the first or second embodiment of the present invention is used as an output device.

The wet type image forming apparatus of the present invention may use as an output device in an information processing system, such as a computer system, a copier and a facsimile, and the like. As shown in FIG. 9, the information processing system is composed of a wet type image forming apparatus 10 and an information processor 11. The wet type image forming apparatus according to the first or second embodiment of the present invention may be used as the wet type image forming apparatus 10.

As mentioned above, in the present invention, the cheap reed switch is used as the device for detecting the liquid surface level, instead of the expensive peculiar sensor and the like, and the number of reed switches is reduced to the necessary minimum. Then, it is tried to precisely detect the state in the manner of many steps with regard to the liquid surface level. Thus, the present invention can provide the effect of carefully reporting the remaining amount while making the apparatus cheaper.

What is claimed is:

1. A wet type image forming apparatus comprising:
   an ink tank which stores ink;
   a float which has a magnet, and moves upwardly or downwardly in association with a change of a liquid surface of the ink stored in said ink tank;
   n reed switches which are distributedly arranged from an upper portion of said ink tank to a lower portion thereof and are turned ON or OFF in response to the magnet, where n is the integer equal to or more than 2;
   a detector which detects an amount of the ink in said ink tank in m steps based on a combination of ON and OFF states of said n reed switches, where m>n, m is an integer;
   a columnar body which is fixed in said ink tank, wherein said n reed switches are arranged on said columnar body; and
   wherein said m is equal to 2×n.

2. The wet type image forming apparatus according to claim 1, wherein said detector includes:
   a detecting circuit which detects an ON or OFF state of each of said n reed switches;
   a memory which stores a correspondence relation of the combination of the ON and OFF states of said n reed switches and the amount of the ink in said ink tank, wherein the amount is represented in 2×n steps; and
   a remaining amount judging portion which judges the amount of ink in said ink tank based on the correspondence relation stored in said memory and the combination of ON and OFF states of said n reed switches detected at said detecting circuit.

3. The wet type image forming apparatus according to claim 2,
   wherein said n reed switches are arranged on said columnar body to define response ranges in which each of said n reed switches is turned ON independently; response ranges in which two of said n reed switches adjacent to each other are turned ON; and a non-response range formed at any one of an upper end portion and a bottom tip portion of said columnar body in which all of said n reed switches are turned OFF.

4. The wet type image forming apparatus according to claim 3,
   said 2×n steps are classified into
   n steps in which only one of said n reed switches is turned ON; n−1 steps in which every two of said n reed switches adjacent to each other are turned ON; and one step in which all of said n reed switches are turned OFF.

5. The wet type image forming apparatus according to claim 4, further comprising:
   a display which displays the ink amount judged by said remaining amount judging portion.

6. A wet type image forming apparatus comprising:
   an ink tank which stores ink;
   a float which has a magnet, and moves upwardly or downwardly in association with a change of a liquid surface of the ink stored in said ink tank;
   n reed switches which are distributedly arranged from an upper portion of said ink tank to a lower portion thereof and are turned ON or OFF in response to the magnet, where n is the integer equal to or more than 2;
   a detector which detects an amount of the ink in said ink tank in m steps based on a combination of ON and OFF states of said n reed switches, where m>n, m is an integer;
   a columnar body which is fixed in said ink tank, wherein said n reed switches are arranged on said columnar body; and
   wherein said m is equal to 2×n+1.

7. The wet type image forming apparatus according to claim 6, wherein said detector includes:
   a detecting circuit which detects an ON or OFF state of each of said n reed switches;
   a memory which stores a correspondence relation of the combination of the ON and OFF states of said n reed switches and the amount of the ink in said ink tank, wherein the amount is represented in 2×n+1 steps; and
   a remaining amount judging portion which judges the amount of ink in said ink tank based on the correspondence relation stored in said memory and the combination of ON and OFF states of said n reed switches detected at said detecting circuit.

8. The wet type image forming apparatus according to claim 7,
   wherein said n reed switches are arranged on said columnar body to define response ranges in which each of said n reed switches is turned ON independently; response ranges in which two of said n reed switches adjacent to each other are turned ON; and a non-response range formed at any one of an upper end portion and a bottom tip portion of said columnar body in which all of said n reed switches are turned OFF.

9. The wet type image forming apparatus according to claim 8,
   said 2×n+1 steps are classified into
   n steps in which only one of said n reed switches is turned ON; n−1 steps in which every two of said n reed switches adjacent to each other are turned ON; and two steps in which all the reed switches are turned OFF.

10. The wet type image forming apparatus according to claim 9, further comprising:
    a developing device to which the ink from said ink tank is supplied,
    wherein the interval between a first reed switch arranged in an upper end portion of said columnar body and a second reed switch arranged adjacently to the first reed switch is set such that when the ink is supplied to said developing device from said ink tank under a condition in which a liquid surface is present at the upper end portion, an ink amount is decreased by one step.

11. The wet type image forming apparatus according to claim 10,
    wherein said remaining amount judging portion supplies the ink from said ink tank to said developing device when said detecting circuit detects a state showing that all of said n reed switches are in the OFF state immediately after a power turned on, then judges that the liquid surface is present in the bottom tip portion of said ink tank when the ink amount is not decreased by one step, and judges that the liquid surface is present in the upper end portion of said ink tank when the ink amount is decreased by one step.

12. The wet type image forming apparatus according to claim 11, further comprising:
    a display which displays the ink amount judged by said remaining amount judging portion.

13. An information processing system comprising:
    a wet type image forming apparatus; and
    a processor which processes information and outputs the processed result to the wet type image forming apparatus, wherein said wet type image forming apparatus comprising:
   an ink tank which stores ink;
   a float which has a magnet, and moves upwardly or downwardly in association with a change of a liquid surface of the ink stored in said ink tank;
   n reed switches which are distributedly arranged from an upper portion of said ink tank to a lower portion thereof and are turned ON or OFF in response to said magnet, where n is an integer equal to or more than 2;
   a detector which detects an amount of the ink in said ink tank in m steps based on a combination of ON and OFF states of said n reed switches, where m>n, m is an integer;
wherein said wet type image forming apparatus further comprising:
   a columnar body which is fixed in said ink tank, wherein said n reed switches are arranged on said columnar body
   wherein said m in the wet type image forming apparatus is equal to 2×n.

14. The information processing system according to claim 13, wherein said detector of said wet type image forming apparatus includes:
   a detecting circuit which detects an ON or OFF state of each of said n reed switches;
   a memory which stores a correspondence relation of the combination of the ON and OFF states of said n reed switches and the amount of the ink in said ink tank, wherein the amount is represented in 2×n steps and
   a remaining amount judging portion which judges the amount of ink in said ink tank based on the correspondence relation stored in said memory and the combination of ON and OFF states of said n reed switches detected at said detecting circuit.

15. The information processing system according to claim 14, wherein said n reed switches of said wet type image forming apparatus are arranged on said columnar body to define response ranges in which each of said n reed switches is turned ON independently; response ranges in which two of said n reed switches adjacent to each other are turned ON; and a non-response range formed at any one of a upper end portion and a bottom tip portion of said columnar body in which all of said n reed switches are turned OFF.

16. The information processing system according to claim 15, wherein said 2×n steps of said wet type image forming apparatus are classified into
   n steps in which only one of said n reed switches is turned ON; n−1 steps in which every two of said n reed switches adjacent to each other are turned ON; and one step in which all of said n reed switches are turned OFF.

17. The information processing system according to claim 16, wherein said wet type image forming apparatus further comprising:
   a display which displays the ink amount judged by said remaining amount judging portion.

18. An information processing system comprising:
a wet type image forming apparatus; and
a processor which processes information and outputs the processed result to the wet type image forming apparatus,
wherein said wet type image forming apparatus comprising:
   an ink tank which stores ink;
   a float which has a magnet, and moves upwardly or downwardly in association with a change of a liquid surface of the ink stored in said ink tank;
   n reed switches which are distributedly arranged from an upper portion of said ink tank to a lower portion thereof and are turned ON or OFF in response to said magnet, where n is an integer equal to or more than 2;
   a detector which detects an amount of the ink in said ink tank in m steps based on a combination of ON and OFF states of said n reed switches, where m>n, m is an integer;
   a columnar body which is fixed in said ink tank, wherein said n reed switches are arranged on said columnar body; and
   wherein said m in said wet type image forming apparatus is equal to 2×n+1.

19. The information processing system according to claim 18, wherein said detector of said wet type image forming apparatus includes:
   a detecting circuit which detects an ON or OFF state of each of said n reed switches;
   a memory which stores a correspondence relation of the combination of the ON and OFF states of said n reed switches and the amount of the ink in said ink tank, wherein the amount is represented in 2×n+1 steps; and
   a remaining amount judging portion which judges the amount of ink in said ink tank based on the correspondence relation stored in said memory and the combination of ON and OFF states of said n reed switches detected at said detecting circuit.

20. The information processing system according to claim 19, wherein said n reed switches of said wet type image forming apparatus are arranged on said columnar body to define response ranges in which each of said n reed switches is turned ON independently; response ranges in which two of said n reed switches adjacent to each other are turned ON; and a non-response range formed at any one of an upper end portion and a bottom tip portion of said columnar body in which all of said n reed switches are turned OFF.

21. The information processing system according to claim 20 wherein said 2×n+1 steps of said wet type image forming apparatus are classified into
   n steps in which only one of said n reed switches is turned ON; n−1 steps in which every two of said n reed switches adjacent to each other are turned ON; and two steps in which all the reed switches are turned OFF.

22. The information processing system according to claim 21, wherein said wet type image forming apparatus further comprising:
   a developing device to which the ink from said ink tank is supplied,
   wherein the interval between a first reed switch arranged in an upper end portion of said columnar body and a second reed switch arranged adjacently to the first reed switch is set such that when the ink is supplied to said developing device from said ink tank under a condition in which a liquid surface is present at the upper end portion, an ink amount is decreased by one step.

23. The information processing system according to claim 22, wherein said remaining amount judging portion of said wet type image forming apparatus supplies the ink from said ink tank to said developing device when said detecting circuit detects a state showing that all of said n reed switches are in the OFF state immediately after a power turned on, then judges that the liquid surface is present in the bottom tip portion of said ink tank when the ink amount is not decreased by one step, and judges that the liquid surface is present in the upper end portion of said ink tank when the ink amount is decreased by one step.

24. The information processing system according to claim 23, wherein said wet type image forming apparatus further comprising:
   a display which displays the ink amount judged by said remaining amount judging portion.

* * * * *